United States Patent
Sundararajan

(10) Patent No.: US 11,549,594 B2
(45) Date of Patent: *Jan. 10, 2023

(54) GATE VALVE

(71) Applicant: SRI Energy, Inc., Stafford, TX (US)

(72) Inventor: Alagarsamy Sundararajan, Sugar Land, TX (US)

(73) Assignee: SRI ENERGY, INC., Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,320

(22) Filed: Jun. 14, 2021

(65) Prior Publication Data

US 2021/0310566 A1 Oct. 7, 2021

Related U.S. Application Data

(63) Continuation of application No. 16/889,881, filed on Jun. 2, 2020, now Pat. No. 11,131,393, which is a (Continued)

(51) Int. Cl.
*F16K 3/02* (2006.01)
*F16K 3/20* (2006.01)
(Continued)

(52) U.S. Cl.
CPC ........... *F16K 3/0218* (2013.01); *F16J 15/164* (2013.01); *F16J 15/3236* (2013.01); (Continued)

(58) Field of Classification Search
CPC ...... F16K 3/0236; F16K 3/0227; F16K 3/207; F16K 3/20; F16K 3/188; F16K 3/18
See application file for complete search history.

(56) References Cited

U.S. PATENT DOCUMENTS

| | | |
|---|---|---|
| 1,708,851 A | 4/1929 | Sparks |
| 1,752,657 A | 4/1930 | Sparks |
| 2,030,458 A | 2/1936 | Mckellar et al. |
| 2,359,741 A | 10/1944 | Venton et al. |
| 2,815,187 A | 3/1957 | Hamer |

(Continued)

FOREIGN PATENT DOCUMENTS

| | | |
|---|---|---|
| BE | 1013672 A3 | 6/2002 |
| DE | 2113415 A1 | 10/1971 |

(Continued)

OTHER PUBLICATIONS

European Patent Office, Extended Search Report dated Aug. 9, 2021 in European Patent Application No. 21158788.6 (13 pages).

(Continued)

*Primary Examiner* — David Colon-Morales
(74) *Attorney, Agent, or Firm* — Trop, Pruner & Hu, P.C.

(57) ABSTRACT

An embodiment includes a gate valve comprising: a valve body including a cavity coupled to a channel having proximal and distal portions; a gate to seal and unseal the channel; proximal and distal seats adjacent the gate; wherein (a) the proximal seat traverses towards the gate and stops at a first position when the gate is closing and the proximal channel portion is more highly pressurized than the cavity, and (b) the distal seat slides away from the gate and stops at a second position when the gate is closing and the cavity is more heavily pressurized than the distal channel portion. Other embodiments are described herein.

13 Claims, 14 Drawing Sheets

Related U.S. Application Data continuation of application No. 15/885,348, filed on Jan. 31, 2018, now Pat. No. 10,677,360, which is a continuation of application No. 14/706,065, filed on May 7, 2015, now Pat. No. 9,885,420.

(51) Int. Cl.
  *F16K 27/04* (2006.01)
  *F16J 15/16* (2006.01)
  *F16J 15/3236* (2016.01)

(52) U.S. Cl.
  CPC .......... *F16K 3/0227* (2013.01); *F16K 3/0236* (2013.01); *F16K 3/20* (2013.01); *F16K 3/207* (2013.01); *F16K 27/044* (2013.01)

(56) References Cited

U.S. PATENT DOCUMENTS

| | | |
|---|---|---|
| 2,796,230 A | 6/1957 | Grove et al. |
| 2,797,063 A | 6/1957 | Hobbs |
| 2,810,543 A | 10/1957 | Bryant |
| 2,861,771 A | 11/1958 | Bryant |
| 2,985,422 A | 5/1961 | Anderson |
| 3,006,599 A | 10/1961 | Eckert, Jr. |
| 3,013,769 A | 12/1961 | Volpin |
| 3,065,951 A | 11/1962 | Richard et al. |
| 3,095,004 A | 6/1963 | Jackson et al. |
| 3,109,623 A | 11/1963 | Bryant |
| 3,204,924 A | 9/1965 | Bredischneider |
| 3,235,224 A | 2/1966 | Grove |
| 3,269,699 A | 8/1966 | Tomlin |
| 3,273,855 A | 9/1966 | Wells |
| 3,301,523 A | 1/1967 | Lowrey |
| 3,335,999 A | 8/1967 | Lowrey |
| 3,347,261 A | 10/1967 | Yancey |
| 3,353,783 A | 11/1967 | Bolling, Jr. |
| 3,401,915 A | 9/1968 | Kim |
| 3,414,233 A | 12/1968 | Priese et al. |
| 3,446,476 A | 5/1969 | Scaramucci |
| 3,497,177 A | 2/1970 | Hulsey |
| 3,504,885 A | 4/1970 | Hulsey |
| 3,542,335 A | 11/1970 | Scaramucci |
| 3,667,727 A | 6/1972 | Bowden |
| 3,890,991 A | 6/1975 | Grove et al. |
| 3,972,507 A | 8/1976 | Grove |
| 4,062,516 A | 12/1977 | Grove |
| 4,067,542 A | 1/1978 | Morrison |
| 4,068,821 A | 1/1978 | Morrison |
| 4,124,194 A | 11/1978 | Alvarez et al. |
| 4,136,710 A | 1/1979 | Bond |
| 4,175,577 A | 11/1979 | Kacal et al. |
| 4,192,483 A | 3/1980 | Combes |
| 4,217,923 A | 8/1980 | Kindersley |
| 4,264,054 A | 4/1981 | Morrill |
| 4,273,309 A * | 6/1981 | Morrison ............... F16K 5/0673 251/174 |
| 4,364,544 A | 12/1982 | Kim |
| 4,471,943 A | 9/1984 | Nelson |
| 4,483,511 A | 11/1984 | Kushida et al. |
| 4,513,947 A | 4/1985 | Amend |
| 4,557,286 A | 12/1985 | Nagano |
| 4,566,482 A | 1/1986 | Stunkard |
| 4,577,834 A | 3/1986 | Oliver |
| 4,592,558 A | 6/1986 | Hopkins |
| 4,643,395 A | 2/1987 | Williams, Jr. |
| 4,706,970 A | 11/1987 | Ramirez |
| 4,741,509 A | 5/1988 | Bunch et al. |
| 4,824,074 A | 4/1989 | Baugh |
| 4,878,651 A | 11/1989 | Meyer, Jr. |
| 4,971,098 A | 11/1990 | Stroud |
| 5,029,812 A | 7/1991 | Haynes |
| 5,090,661 A | 2/1992 | Parks, Jr. et al. |
| 5,163,655 A | 11/1992 | Chickering, III et al. |
| 5,192,051 A | 3/1993 | Roberson |
| 5,201,872 A | 4/1993 | Dyer |
| 5,211,373 A | 5/1993 | Baker |
| 5,320,327 A | 6/1994 | Beson |
| 5,445,359 A | 8/1995 | Beson |
| 5,482,249 A | 1/1996 | Schafbuch et al. |
| 5,624,101 A | 4/1997 | Beson |
| 5,927,687 A | 7/1999 | Krause |
| 6,065,736 A | 5/2000 | Hunt |
| 6,279,875 B1 | 8/2001 | Chatufale |
| 6,454,015 B1 | 9/2002 | Armstrong et al. |
| 6,575,426 B2 | 6/2003 | Sundararajan |
| 6,601,650 B2 | 8/2003 | Sundararajan |
| 6,609,533 B2 | 8/2003 | Sundararajan |
| 6,664,572 B2 | 12/2003 | Chatufale |
| 6,684,897 B2 | 2/2004 | Sundararajan |
| 6,966,537 B2 | 11/2005 | Sundararajan |
| 7,004,452 B2 | 2/2006 | Chatufale |
| 7,040,408 B2 | 5/2006 | Sundararajan et al. |
| 7,306,201 B2 | 12/2007 | Lam |
| 7,562,859 B2 | 7/2009 | Lam et al. |
| 7,578,349 B2 | 8/2009 | Sundararajan et al. |
| 7,992,840 B2 | 8/2011 | Cain et al. |
| 8,070,131 B2 * | 12/2011 | Liew ................ F16K 3/02 251/326 |
| 8,091,861 B2 | 1/2012 | Nesje |
| 8,205,890 B2 | 6/2012 | Sundararajan |
| 8,327,866 B2 | 12/2012 | Parks, Jr. |
| 8,662,473 B2 | 3/2014 | Comeaux |
| 8,672,295 B2 * | 3/2014 | Dhawan ............ F16K 3/0209 251/328 |
| 8,714,263 B2 | 5/2014 | Sundararajan et al. |
| 8,740,174 B2 | 6/2014 | Juda et al. |
| 8,794,593 B2 * | 8/2014 | Kahn .............. F16K 3/0227 251/328 |
| 9,010,725 B2 | 4/2015 | Hunter |
| 9,316,322 B2 * | 4/2016 | Alexander .......... F16K 3/0263 |
| 9,885,420 B2 * | 2/2018 | Sundararajan ......... F16K 3/207 |
| 10,677,360 B2 * | 6/2020 | Sundararajan ........ F16K 3/0236 |
| 11,131,393 B2 * | 9/2021 | Sundararajan ......... F16J 15/164 |
| 2002/0124889 A1 | 9/2002 | Sundararajan |
| 2003/0015681 A1 | 1/2003 | Chatufale |
| 2003/0029619 A1 | 2/2003 | Sundararajan |
| 2003/0030017 A1 | 2/2003 | Sundararajan |
| 2003/0116200 A1 | 6/2003 | Sundararajan |
| 2004/0177969 A1 | 9/2004 | Sundararajan et al. |
| 2004/0178381 A1 | 9/2004 | Sundararajan |
| 2005/0067599 A1 | 3/2005 | Chatufale |
| 2006/0151175 A1 | 7/2006 | Sundararajan et al. |
| 2006/0231786 A1 | 10/2006 | Witt |
| 2007/0052181 A1 | 3/2007 | Nakamura |
| 2010/0012326 A1 | 1/2010 | Sundararajan et al. |
| 2010/0052267 A1 | 3/2010 | Castleman et al. |
| 2011/0266481 A1 | 11/2011 | Collison et al. |
| 2012/0080634 A1 | 4/2012 | Fenton |
| 2012/0085957 A1 | 4/2012 | Dhawan et al. |
| 2012/0256113 A1 | 10/2012 | Comeaux |
| 2012/0261603 A1 | 10/2012 | Kahn et al. |
| 2012/0318528 A1 | 12/2012 | Wolfe et al. |
| 2013/0277589 A1 | 10/2013 | Vaughan |
| 2014/0034861 A1 * | 2/2014 | Scattini ............. F16K 3/02 251/328 |
| 2014/0183396 A1 | 7/2014 | Hunter et al. |
| 2014/0231090 A1 | 8/2014 | Sundararajan et al. |
| 2014/0239212 A1 | 8/2014 | Häland |
| 2015/0014568 A1 | 1/2015 | Sundararajan |
| 2015/0267819 A1 * | 9/2015 | Duong ............ F16K 3/0236 251/328 |

FOREIGN PATENT DOCUMENTS

| | | |
|---|---|---|
| DE | 60221254 T2 | 4/2007 |
| EP | 1415104 A1 | 5/2004 |
| EP | 1456501 A2 | 9/2004 |
| EP | 2366920 A1 | 9/2011 |
| EP | 3292329 B1 | 2/2021 |
| GB | 221401 A | 12/1923 |
| GB | 1161202 A | 8/1969 |
| GB | 1181228 A | 2/1970 |

(56) References Cited

FOREIGN PATENT DOCUMENTS

| GB | 2501272 A | 10/2013 |
|---|---|---|
| WO | 1998025057 A2 | 6/1998 |
| WO | 2003014604 A2 | 2/2003 |
| WO | 2003014608 A1 | 2/2003 |
| WO | 2004113158 A2 | 12/2004 |
| WO | 2015006291 A1 | 1/2015 |
| WO | 2016179201 A1 | 11/2016 |

OTHER PUBLICATIONS

European Patent Office, Communication pursuant to Rules 70(2) and 70a(2) EPC dated Jan. 8, 2019 in European Patent Application No. 16789957.4, 13 pages.
European Patent Office, Extended European Search Report dated Mar. 2, 2016 in European Patent Application No. 14822690.5.
International Search Authority, International Search Report and Written Opinion, dated Oct. 22, 2014 in International Application No. PCT/US2014/045692.
International Searech Authority, Written Opinion of the International Searching Authority and the International Search Report, dated Aug. 9, 2016 in International Application No. PCT/US2016/030625.
Saudi Authority for Intellectual Property, Office Action dated Dec. 9, 2020 in Saudi Arabian patent application serial No. 517390293 (8 pages).
European Patent Office, Communication pursuant to Article 94(3) EPC dated Jan. 30, 2020 in European Patent Application No. 16789957.4, 5 pages.
United States Patent Office, Non-Final Office Action dated Sep. 15, 2015 in U.S. Appl. No. 14/311,419 (14 pages).
Saudia Arabia Patent Ohfice, Office Action dated Jun. 4, 2021 in Saudia Arabian Patent Application No. 517390293(6 pages).
Saudia Arabia Patent Office, Office Action dated Jun. 13, 2022 in Saudia Arabian Patent Application No. 517390293(6 pages).
Saudia Arabia Patent Office, Office Action dated Oct. 25, 2022 in Saudia Arabian Patent Application No. 517390293 (5 pages).

\* cited by examiner

GATE VALVE

This application is a continuation of U.S. patent application Ser. No. 16/889,881, filed Jun. 2, 2020, which is a continuation of U.S. patent application Ser. No. 15/885,348, filed Jan. 31, 2018, now U.S. Pat. No. 10,677,360, issued Jun. 9, 2020, which is a continuation of U.S. patent application Ser. No. 14/706,065, filed on May 7, 2015, now U.S. Pat. No. 9,885,420, issued Feb. 6, 2018, and entitled "Gate Valve." The contents of the each of the above applications is hereby incorporated by reference.

TECHNICAL FIELD

Embodiments of the invention concern valves and, in particular, gate valves.

BACKGROUND

Gate valves typically have a valve body with a flow passage extending through it. The flow passage intersects a central cavity. A gate is provided to move through the central cavity to block the flow passage. Seal rings are used to bridge a gap between the valve body and the gate to prevent fluid from flowing around the gate and into the valve body at high pressure when the gate blocks the flow passage. When fluid flows around the gate and into the valve body at high pressure over a prolonged period of time the gate valve can develop leaks at significant cost and effort to the operator of the valve.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments. Moreover, the drawings may only show the structures useful to understand the illustrated embodiments. Additional structures known in the art may not have been included to maintain the clarity of the drawings. For example, not every gasket or port or coupling agent (e.g., screw) of a gate valve device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical contact with each other and "coupled" may indicate elements co-operate or interact with each other, but they may or may not be in direct physical contact.

An embodiment includes a gate valve assembly having a valve body with an opening and a seat insert configured to fit into the opening of the valve body. Embodiments including a "single seat configuration" remove leak paths, reduce machining costs, and reduce the number of parts (effectively reducing failure paths) for the system. This saves costs and increases reliability. By "single seat" such an embodiment does not require a seat retainer/seat insert and seat sealing mechanism, instead relying only upon a single component seat sealing mechanism. For example, Patent Application PCT/US2014/045692 (entitled "Gate Valve with Seat Assembly" and filed Jul. 8, 2014) and U.S. Patent Application Publication Number US2015/0014568 (entitled "Gate Valve with Seat Assembly" and filed Jun. 23, 2014) describes a seat insert that couples a seat to a valve body. However, in some "single seat configuration" embodiments described herein no such seat insert is used. Instead, in some embodiments a monolithic seat directly interfaces the valve body.

Figure 1:
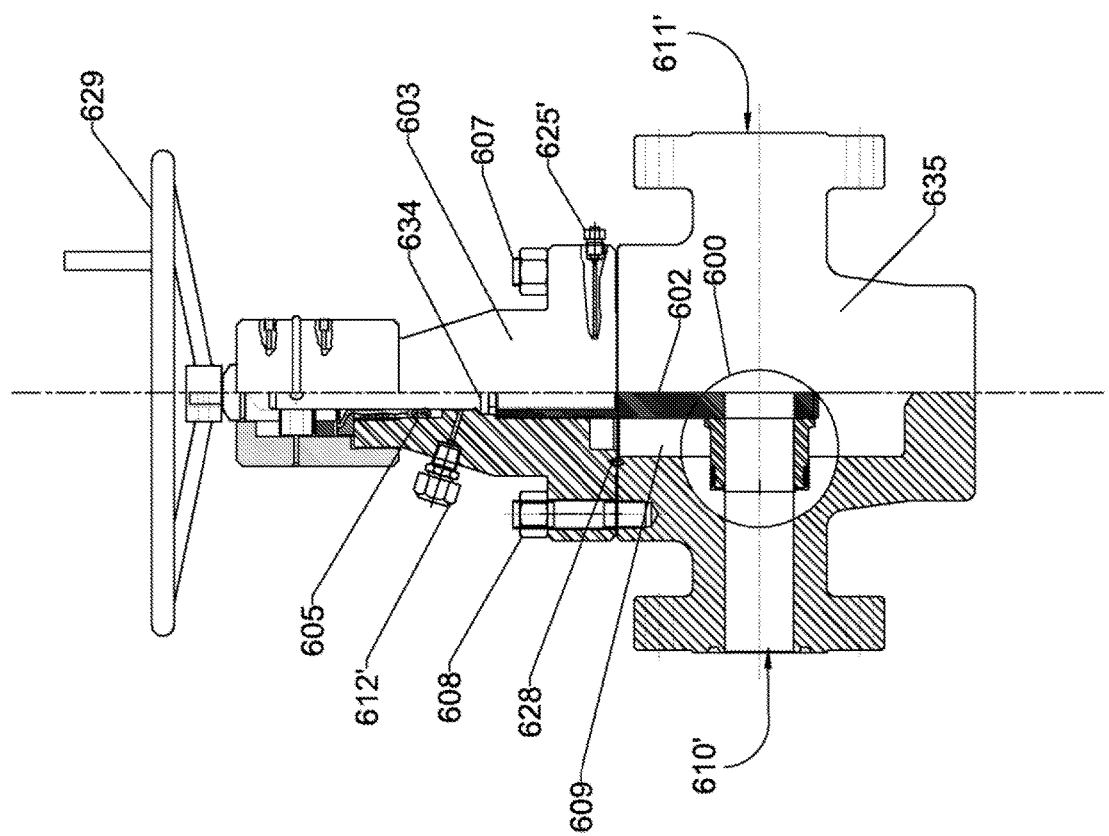
FIG. 1 illustrates a gate valve assembly in an embodiment of the invention.

FIG. 1 illustrates a gate valve assembly in an embodiment. The gate valve assembly is provided with a hand wheel 629, a stem packing seal 605, a bonnet 603, an operating stem 634, a gate 602, a valve body 635, studs 607, nuts 608, and a gate-seat assembly 600. In operation, the gate valve seating assembly 600 is configured so as the hand wheel 629 is actuated (or some similar operator is actuated), the operating stem 634 is moved so the gate 602 can either close or open the channel 601 in the valve body 635. When the gate 602 is in an open position, fluid is allowed to flow through the channel 601 (see FIG. 2) in the valve body 635. When the gate 602 is in a closed position, the flow of fluid is disrupted within the channel 601. A gate valve seating assembly 600 is provided between the valve body 635 and the gate 602 to prevent or lessen leakage of fluid from the channel 601 into cavity 609 when the gate is closed. If this leakage is not prevented, over time high pressure fluid in cavity 609 places pressure on stem packing seal 605, leading to eventual system failure and/or undesired maintenance.

In an embodiment, a two-way gate valve assembly is provided such that either the upstream line or the downstream line can be attached to either side 610', 611' of the valve body. Thus, what is a "distal" seat for flow in one direction is a "proximal" seat when flow reverses. As used herein "distal" and "downstream" are used interchangeably and "proximal" and "upstream" are used interchangeably.

The bonnet 603 is mounted to the valve body 635 by studs 607 and secured with hex nuts 608. The bonnet 603 is sealed with respect to the valve body 635 by a bonnet gasket 628. The seal of the stem packing 605 provides a seal between the bonnet 603 and the operating stem 634. The seat assemblies between the valve body 635 and the gate 602 are described in greater detail with reference to FIGS. 5 and 6. Attached to the bonnet 603 are autoclave fittings 612' and 625'. Autoclave fitting 612' is a bleed port or a pressure release valve which allows an operator to release pressure with respect to the valve body and the bonnet. Autoclave fitting 625' is a grease port fitting that allows an operator to introduce a lubricant to the gate 602 and seat assembly 600.

Figure 2:
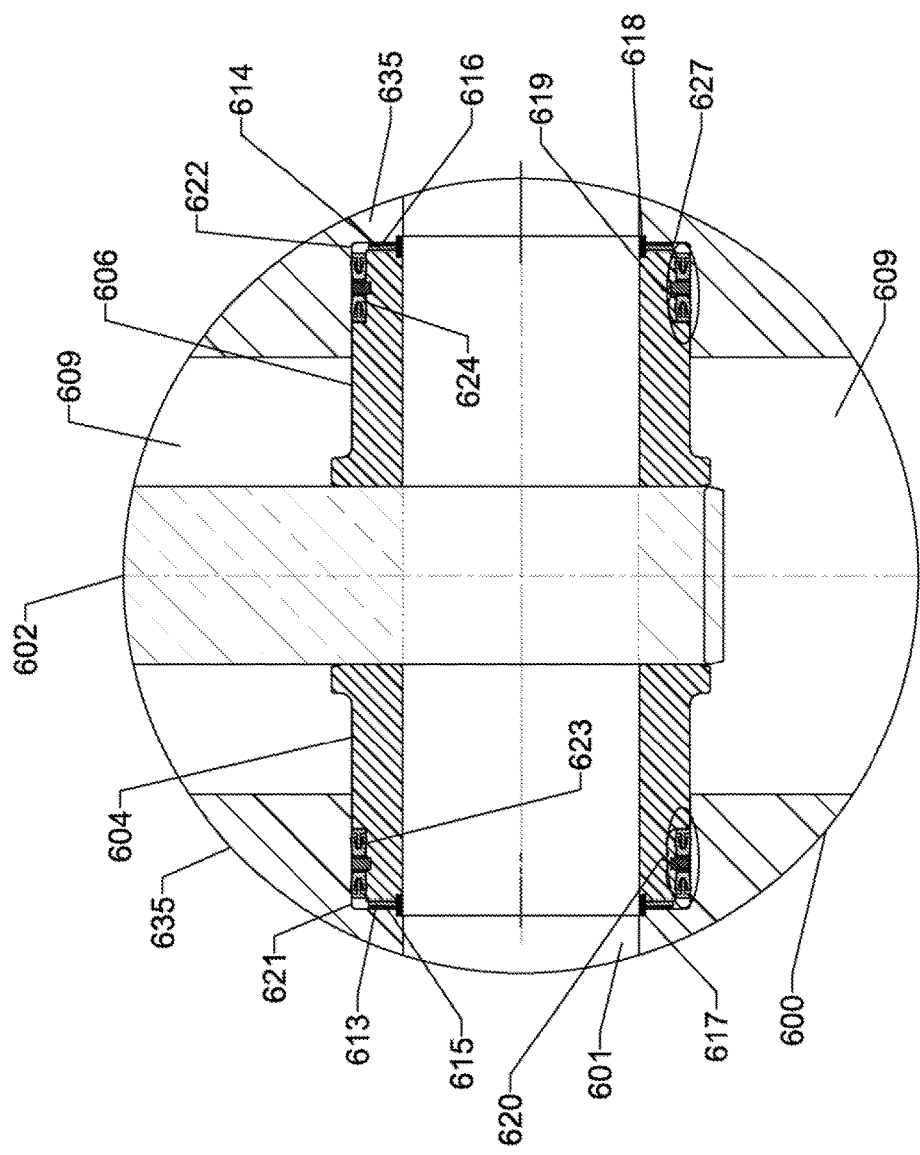
FIG. 2 illustrates two seat assemblies on either side of a gate (in a closed position) in an embodiment of the invention.
Figure 3:
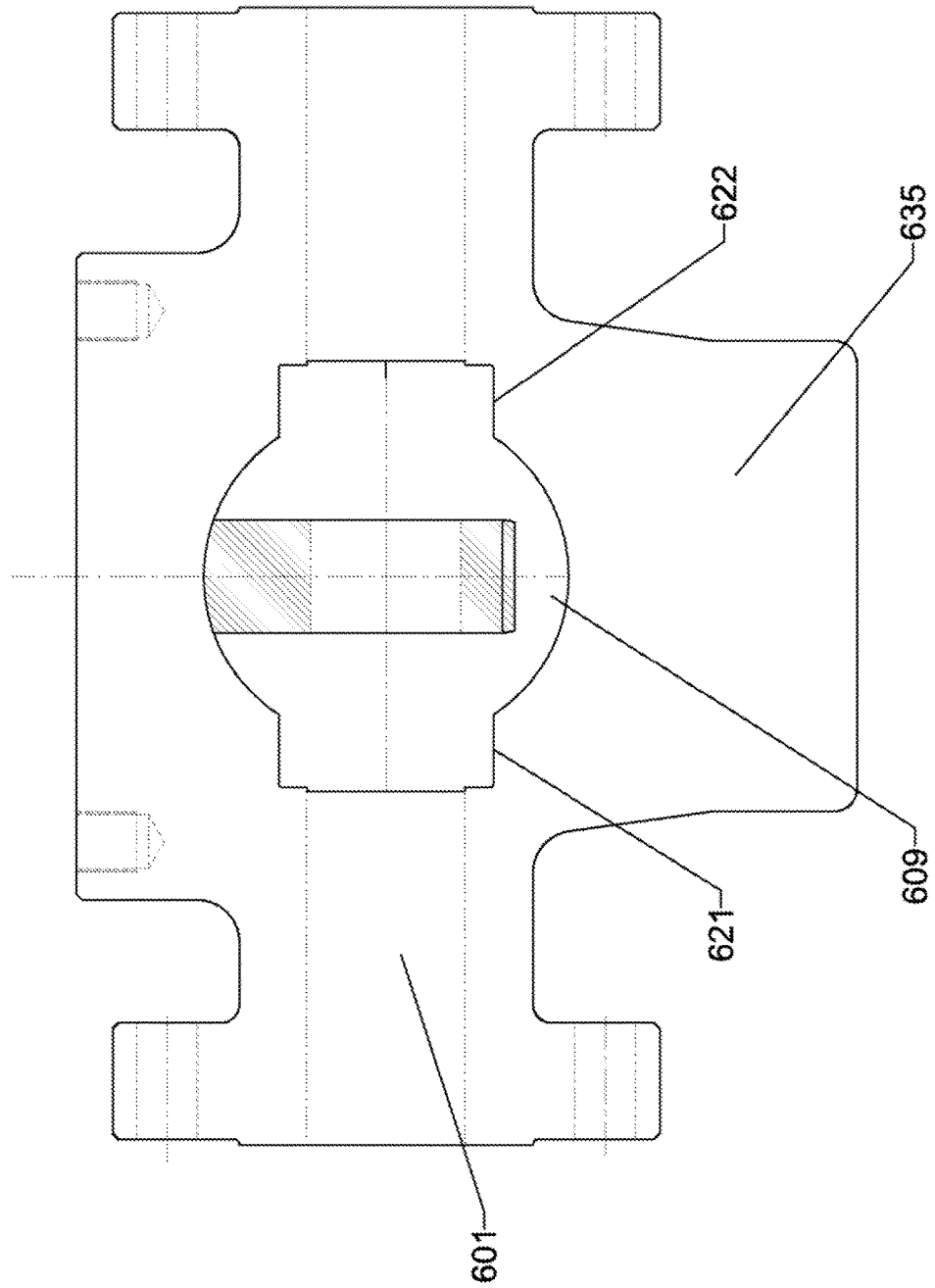
FIG. 3 illustrates the location of seat pockets in an embodiment of the invention.
Figure 4:
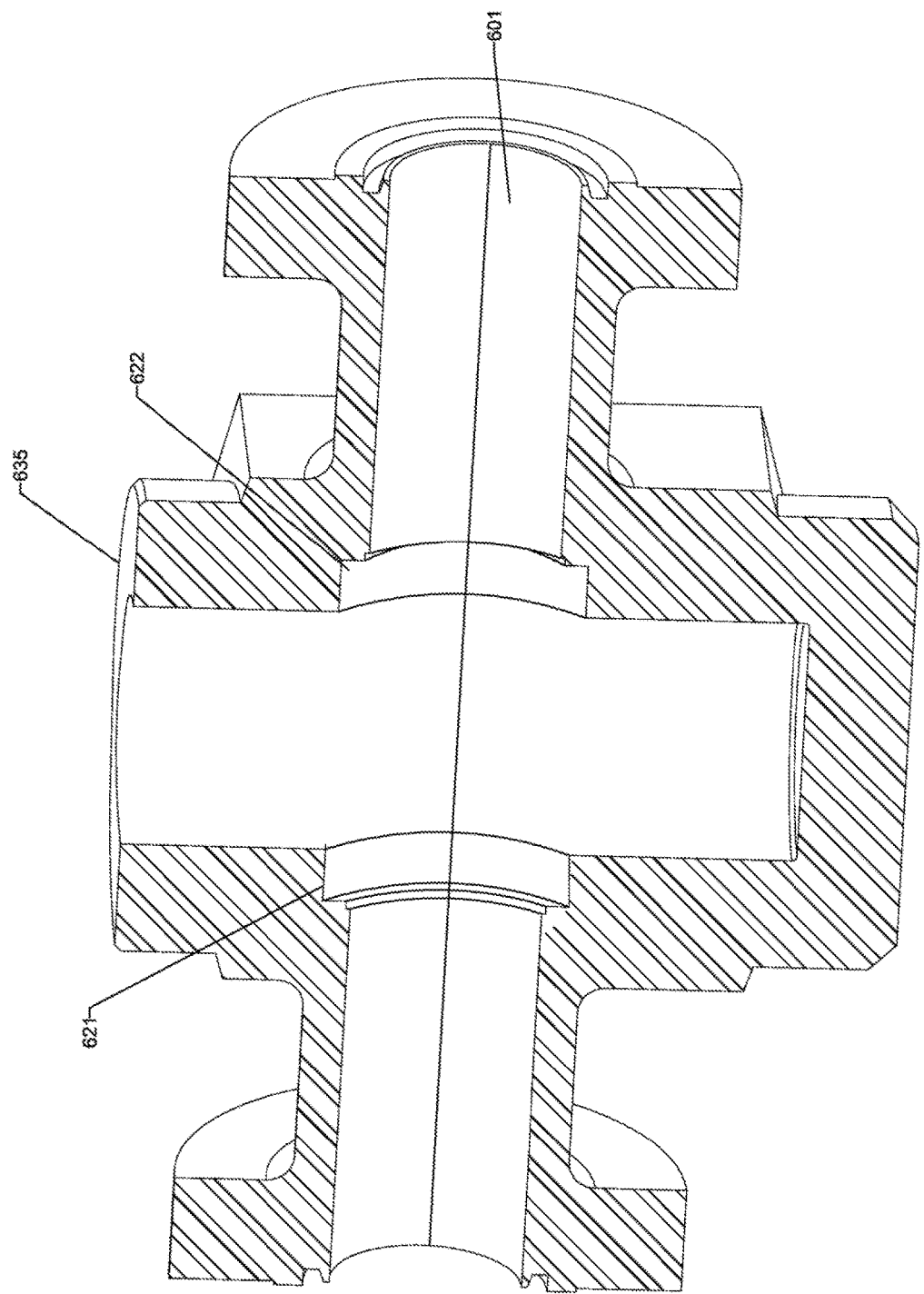
FIG. 4 illustrates seat pockets in an embodiment of the invention.
Figure 5:
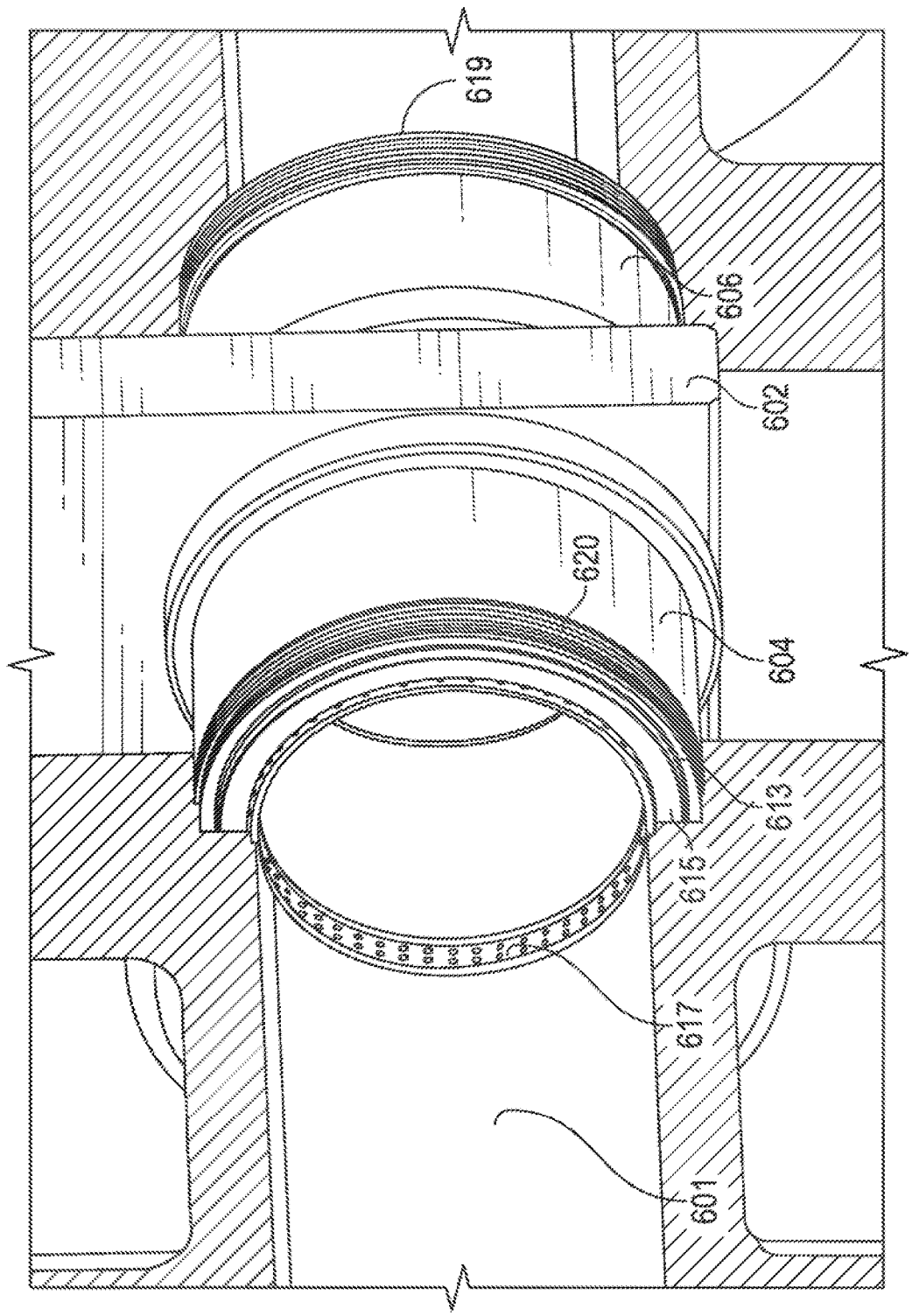
FIG. 5 illustrates two seat assemblies adjacent the gate (in a closed position) in an embodiment of the invention.
Figure 6:
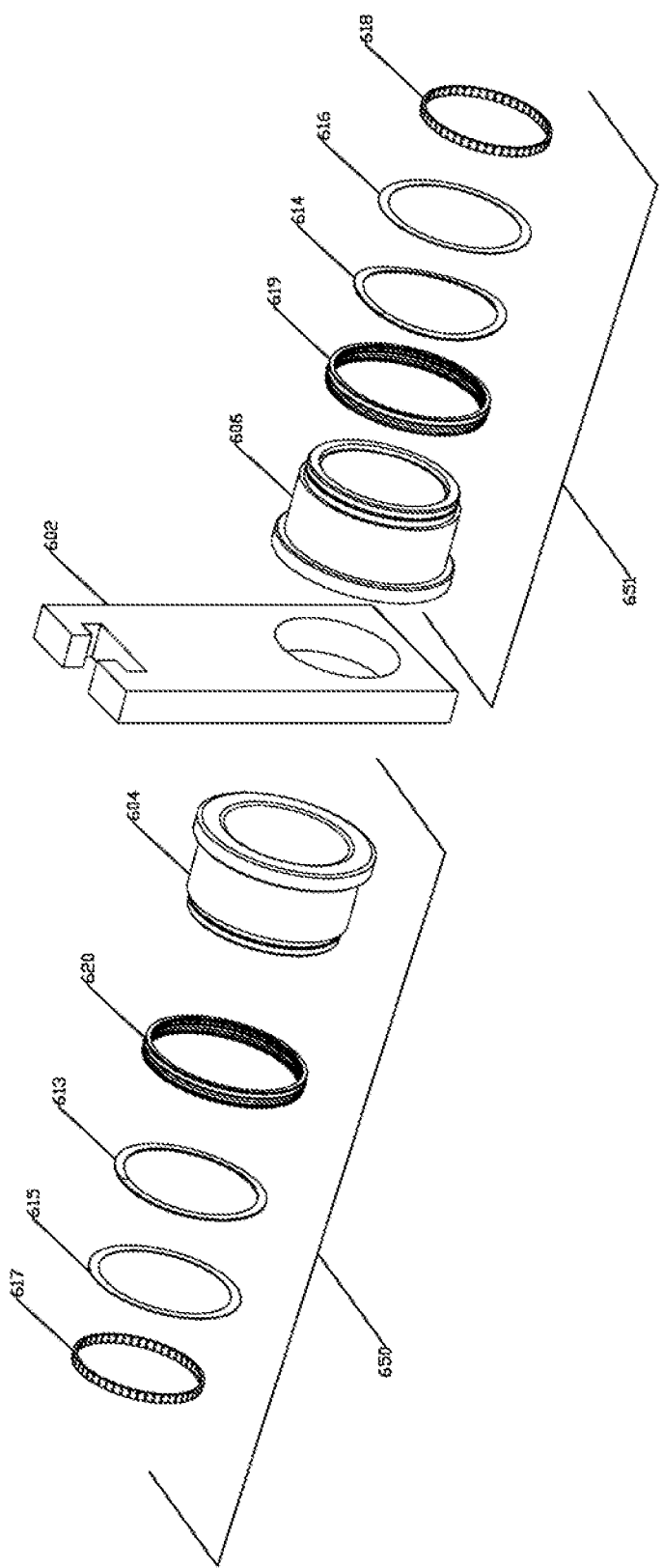
FIG. 6 illustrates an exploded view of a gate and seat assemblies in an embodiment of the invention.

FIG. 2 provides a zoomed in view of gate valve seat assembly 600. Seat assemblies 650, 651 (embodiments of which are shown in FIGS. 5 and 6) are positioned to surround channel 601 and may be cylindrical in construction and may insert into cylindrical shaped pockets (e.g., seat pockets 621, 622 of FIGS. 3 and 4). The gate valve assembly 600 comprises a gate 602 which is used to control fluid flow through the flow bore channel 601 when the gate 602 is actuated. The assembly 600 also includes first and second seats 604, 606 (which comprise part of the seat assemblies shown in FIGS. 5 and 6) on opposing sides of the gate 602. The first and second seats are placed in the seat pockets (which are formed within valve body 635), which in an embodiment are inlayed with corrosion resistant material.

Figure 14:
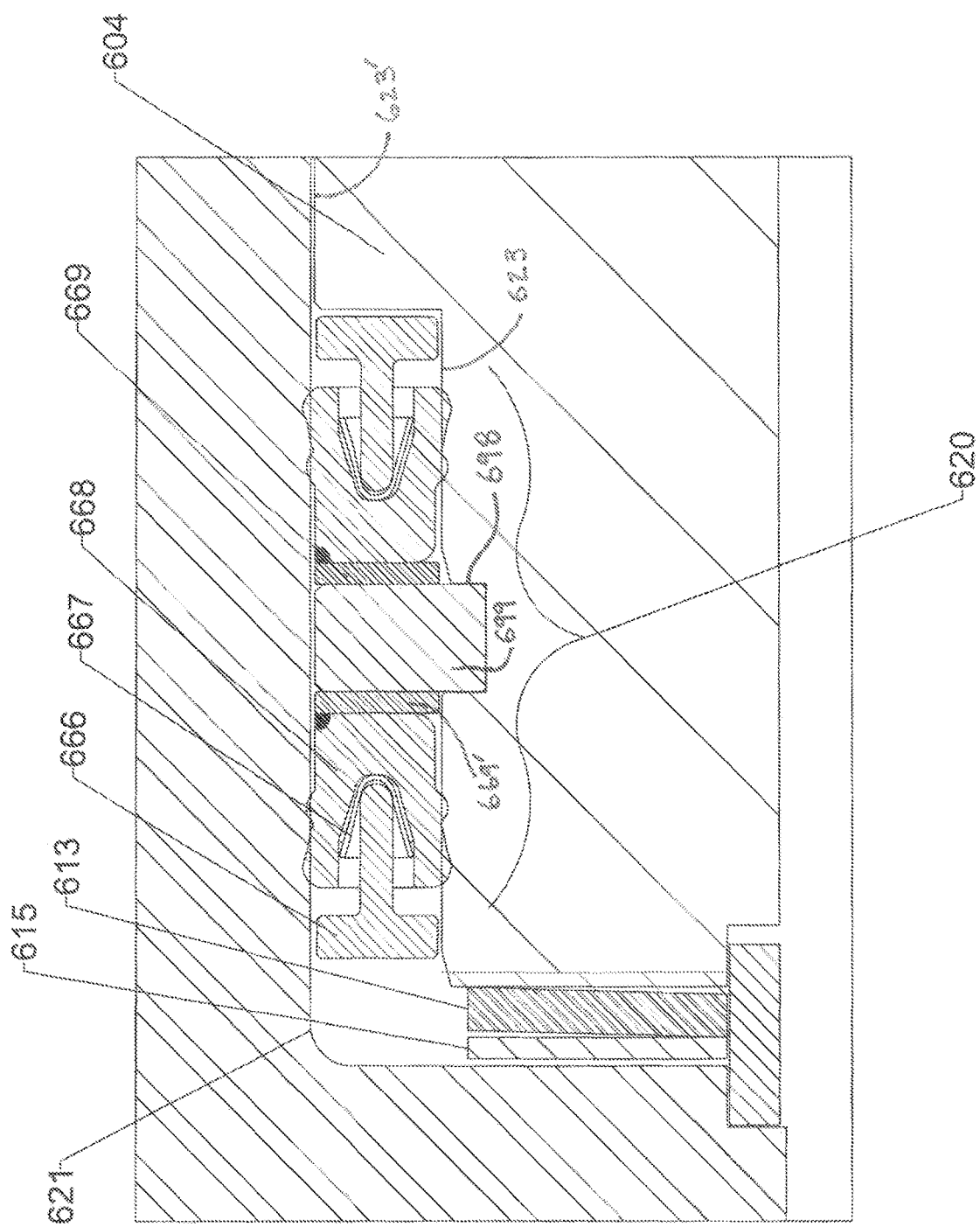
FIG. 14 includes an annular seal body in an embodiment of the invention.

In some embodiments, annular seal assemblies 619, 620 (a close up of which is provided in FIG. 14) are positioned between the seats 604 and 606 and the seat pockets 621, 622. These seal assemblies 619, 620 may be O-rings and/or spring energized type seals. FIG. 14 provides a zoomed in view of a spring energized type seal used in the annular seal assemblies. It is comprised by a hat ring 666 which, when applied with pressure, stabilizes the spring 667. The spring is energized by the clearance between the seat pocket and seat surfaces, meaning when installed, the spring is compressed and is actively pushing outward against the compression. This forces the seal casing 668 against both the pocket 621 and seat 604 surfaces. When pressure enters the concave spring 667 it causes the spring to flare further forcing the seal casing 668 against the sides of both the seat and seat pocket. This seal only works with pressure applied to the concave side, in order to seal from pressure coming the other direction from the valve body the same seal is mirrored on the other side of the spacer 669. Spacers 669, 669' are on either side of annular ring 699. Annular ring 699 resides within annular groove 698, which is located on the outer surface of seat 604. In an embodiment groove 698 is on step 623 (see FIG. 2), whose outer surface has a smaller outer diameter than outer surface 623'. Any other type of mechanically viable seal may also be used in varying embodiments. The seals 611 may be composed of polymer, elastomeric, non-elastomeric, and/or metallic material or some combination thereof and are configured to be suitable to any application depending on the variability of environmental factors such as flow pressure (low/high) and temperature.

The seal assemblies 619, 620 are further adapted to be positioned on steps 623, 624 on the seats 604 and 606. The seats 604 and 606 are further configured to receive and accommodate springs 613 and 614 (shown in greater detail in FIG. 2), which are positioned between the seats and seat pocket protectors 615 and 616. The seats are further configured to receive and accommodate trash rings 617 and 618. In an embodiment, the trash rings 617, 618 provide additional protection against any debris that may enter the space (e.g., space 673) between the seat 604 (and/or seat 606) and the valve body 635. This allows for protection of the space between the valve body and seat as well as providing protection for the seal assemblies 619, 620.

Springs 613 and 614 may include several components, spacers, bushings, rings, and the like as desired to provide an initial seal force. In an embodiment, springs 613 and 614 are circular and surround channel 601. In an embodiment the seat pocket protectors 615 and 616 are used to prevent the springs from creating an indention in the seat pocket inner face 627. In an embodiment, the seat pocket protectors 615, 616 are a material of lower hardness in respect to the material of the seat pocket inner face 621 and the material of the seat/valve body 635. For example, if there were no protector and seat pocket inner faces 621, 622 were inlayed with a non-corrosive material (e.g., hardness=160 HBW) and the springs 613, 614 were made of a normal material (e.g., AISI 4130 with a hardness=200 HBW), as they compress together due to force from springs 613, 614 or fluid pressure, the harder springs 613, 614 would wear into the softer seat pocket inner face inlayed material causing surface indentions in the inlayed material, which leads to leaks. To preserve the seat pocket inner face and any inlayed non-corrosive material and prevent leaking, a sacrificial part, in this case a seat pocket protector 615, 616, is put between the pocket inner faces 621, 622 and springs 613, 614. In an embodiment the pocket protector has a hardness that is less than both the pocket inner face 621, 622 and the springs 613, 614. For the sake of this example, the protector 615, 616 is made of common 316 stainless steel, hardness of 80 HBW, which means that this material will be slowly ground down between the pocket inner face 621, 622 and the springs 613, 614. This allows for protection of the corrosion resistant material inlayed and/or welded into the seat pocket 621, 622 of the valve body 635. Further, the seat pocket protectors 615, 616 keep the corrosion resistant material inlayed and/or welded into the seat pocket 621, 622 from galling, which is when a material is pulled from a contact surface which is under compression.

The arrangement of the protectors, springs, seal assemblies, and seats enable a "dynamic seal" between the valve body seat pocket and the seats. As used herein, with a "dynamic seal" the sealing interface between two or more surfaces (e.g., seat 604 and gate 602) has one surface in motion (e.g., gate 602) relative to the other surface (e.g., seat 604). For example, if the seat 604 is moving while the seal (between seat 604 and gate 602) is not moving, the interface is dynamic and the seal must contain the liquid (e.g., from bore 601) along the full traveling path of the interface. As another example, if the seat 604 is moving while the valve body 635 is not moving, the interface is dynamic and the seal must contain the liquid (e.g., from bore 601) along the full traveling path of the interface. This configuration of protectors, springs, seal assemblies, and seats allows for continuous contact between seats 604, 606 and the surfaces of the gate 602 through the spring force provided by the springs 613 and 614. The springs 613, 614 provide a sealing force to the seats 604, 606, allowing the seat and gate interface to seal, while the spring energized seal assemblies retain their seals between the seat 604, 606 walls and the seat pocket 621, 622 walls.

The above arrangement of the components of the valve assembly 600 provides that the pressure from the flow bore channel 601 effectively seals all of the passages by the seal assemblies 619, 620. They also allow for continuous contact between the seats 604 and 606 and the gate 602 by use of springs 613 and 614 and/or fluid pressure, thereby allowing for sealing at maximum designed working pressures (as well as low pressures). The ability for a valve to fully seal at both low and high pressure is critical for many dynamic and rigorous up-stream applications (e.g., choke and kill manifolds and well-head equipment). A valve for these applications should fully seal throughout its full rated pressure range: 1 psi to maximum rated pressure, which may include 5,000 psi, 10,000 psi, 15,000 psi, 20,000 psi, and greater. The ability for a valve to fully seal at both low and high pressures allows a valve to be given a higher classification. In contrast, conventional gate valves have difficulty gaining a "high classification" because their sealing configuration/mechanisms require 1,500-3,000 psi pressure to fully engage and completely seal (i.e., does not seal at low pressure). In the event that one of these conventional valves needs to seal at a low pressure (e.g., 500 psi or less), it must first be over-pressured to create its seal, then the pressure must be decreased—all of which is cumbersome or not possible for the operator. Such a conventional process creates room for application error, for instance, if a choke used on a 10,000 psi line malfunctions into a low-pressure setting of 300 psi when the line is opened, the common valve further down the line will not have the energizing pressure required to seal, which would result in an uncontrolled flow around the gate. Energizing pressure defines the pressure required to compress a seal enough against a sealing surface to resist the force, due to fluid pressure, trying to push the seal away from the sealing surface. To do this, the compressive force must be more than the fluid force. However, embodiments described herein eliminate or lessen the possibility of this scenario in part, at least partially, to springs 613, 614.

Preexisting valves include a seat retainer (or "seat insert" as referred to in U.S. Patent Application Publication Number US2015/0014568), seat, and gate. This allows for three different leak paths: (1) a seal between the seat retainer and seat pocket, (2) a seal between the seat retainer and seat, and (3) a seal between the seat and the gate. For such a design configuration operation is as follows: as the upstream begins to pressurize, fluid fills the clearance between the seat pocket/seat retainer interface as well as the seat retainer/seat interface. This leaves the retainer seals in a low energy state (i.e., they do not have the required force to create a seal) causing the fluid to flow through the seat pocket/seat retainer interface into the valve cavity. As the fluid fills the cavity, it enters the clearance of the downstream seat pocket/seat retainer and seat retainer/seat interfaces, initially leaking into the downstream channel. When pressure builds, the seals of downstream interfaces (seat pocket/seat retainer interface as well as the seat retainer/seat interface) will see pressure from both the channel and the body valve cavity, resulting in fully energized seals between the gate/seat interface, seat/seat retainer interface, and seat retainer/seat pocket interface as the seat and seat retainer are driven apart, fully sealing the downstream. Once the downstream seals, the upstream seals also see full pressure from both the channel side and cavity side, creating full seals as the upstream seat and seat retainer are also fully driven apart, finally creating a fully sealed channel throughout the valve (both upstream and downstream).

This design configuration has six total potential leak paths (the three interfaces on each of the upstream and downstream sides of the gate), which are increased over time because the seals wear due to friction as the parts rub against one another. If a single seal fails on the downstream side it is possible the whole valve function will fail, requiring immediate maintenance. Additionally the incorporation of so many parts causes unnecessary wear on components, requiring more frequent maintenance.

Figure 12:
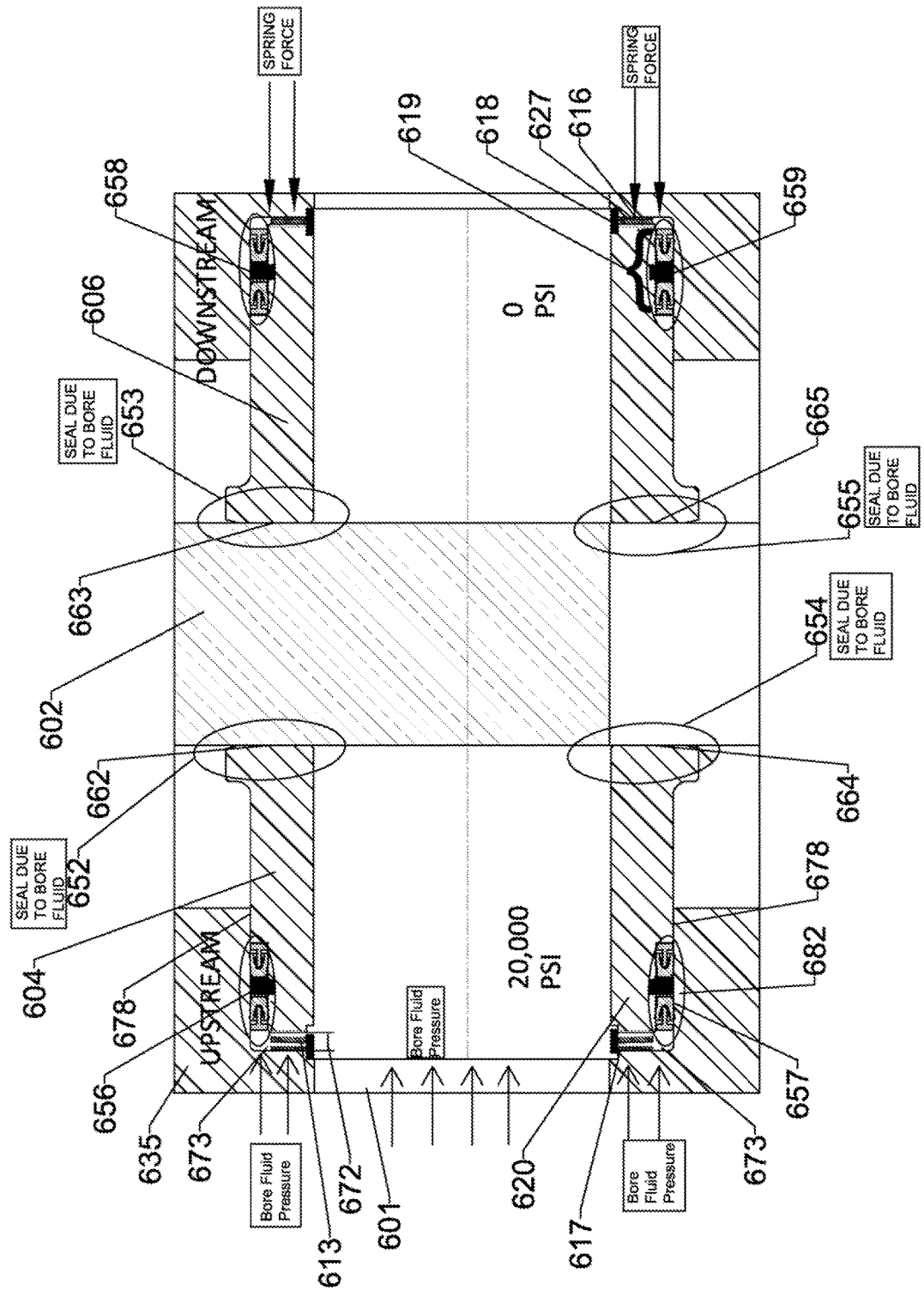
FIG. 12 illustrates gate valve function when the gate is fully closed with high pressure upstream of the gate in an embodiment of the invention.
Figure 13:
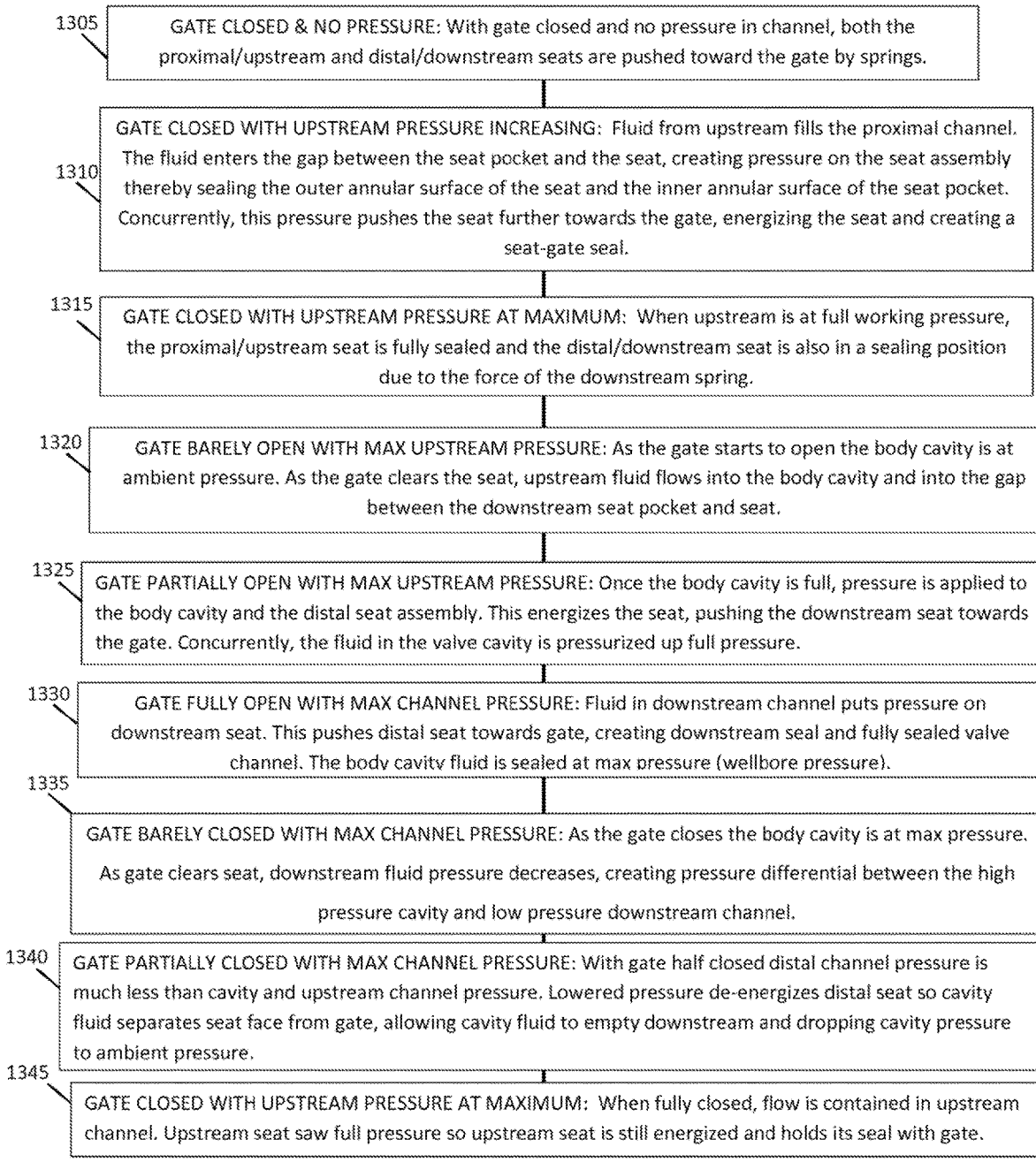
FIG. 13 includes a process in an embodiment of the invention.

In contrast, an embodiment provides a more streamlined and more reliable alternative that requires less maintenance and provides more efficient sealing. FIG. 13 includes a process in a "single seat" embodiment of the invention. The process concerns the embodiment of FIGS. 5-12, 14. The embodiment only features two leak paths on either side of the gate, for a total of four leak paths. For example, the two different leak paths are: (1) the dynamic seal between the seal assembly 620 and seat pocket 621, and (2) the dynamic sealing interface between the seat 604 and the gate 602.

This embodiment allows for full sealing at both the de-energized (see, e.g., FIG. 7, where seal 652 is not energized due to lack of pressure in channel 601) and full-energized (see, e.g., FIG. 10, where seal 652 is energized due to pressure in channel 601) scenarios on both the upstream and downstream sides. If the upstream seal were to fail, the design would function as a common downstream sealing valve, providing two valve functions in one. In other words, conventional valves not only have more failure modes but also have no fail-safe mechanism, as opposed to embodiments described herein. Specifically, if the downstream seal fails in embodiments described herein, the upstream seal will still seal with the gate. Conversely, if the upstream seal fails, the downstream seal will still seal with the gate. Lastly, the seat assembly embodiment of FIGS. 5-12 features primarily only two moving parts (the proximal and distal seats) thereby lowering maintenance and machining costs.

The surfaces of the seats 604 and 606 are adapted to be able to seal with gate 602. The surfaces may be provided with various indentations or a finished surface having a surface area that may be larger or smaller than other surface areas of the seat to affect a variable force acting against the gate so the sealing force that pushes the surfaces together is greater than the force that would urge the two surfaces apart.

Figure 7:
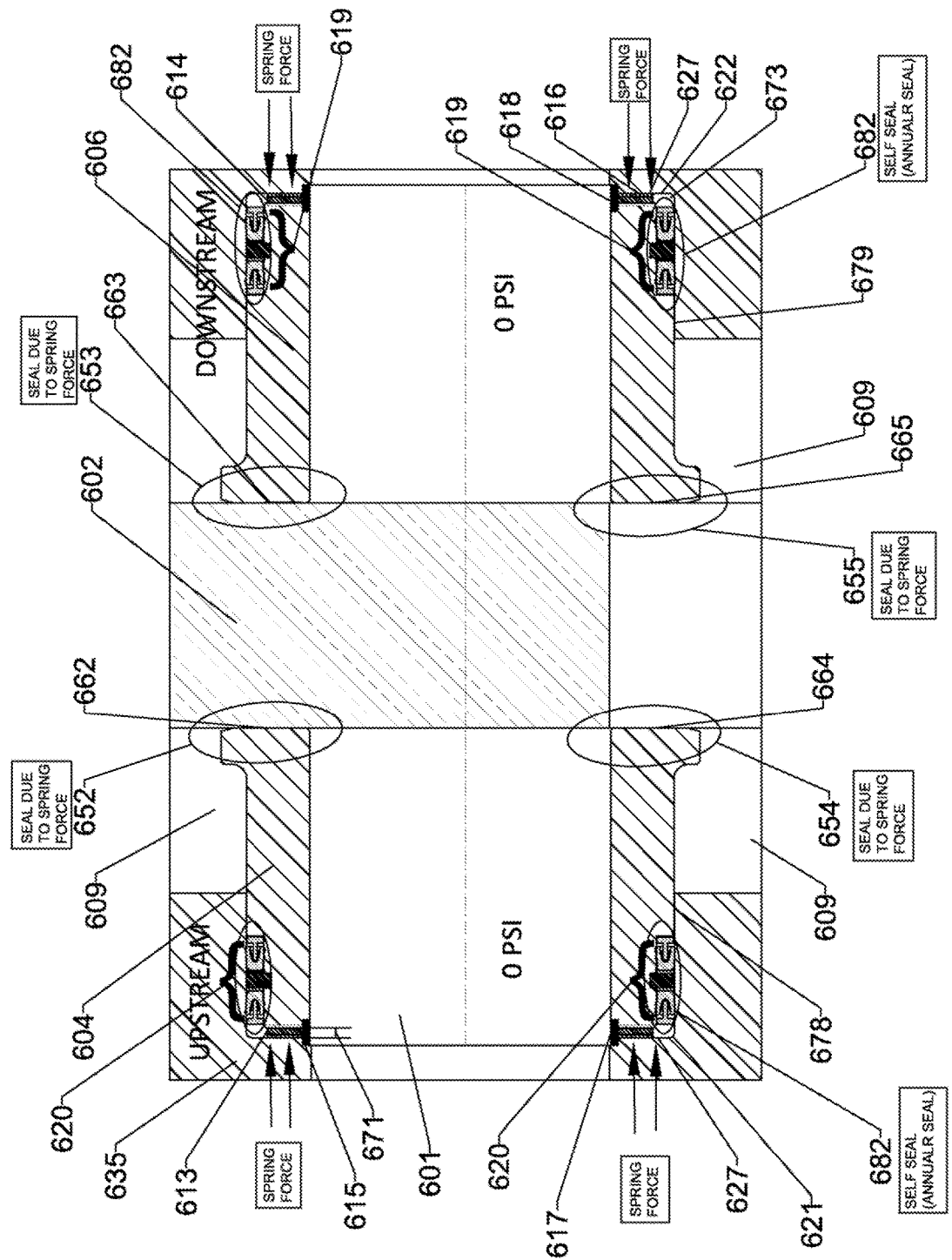
FIG. 7 illustrates gate valve function when the gate is fully closed with no pressure upstream or downstream of the gate in an embodiment of the invention.

FIGS. 5 and 6 illustrate a first seat assembly 650 (604, 620, 613, 615, 617) and a second seat assembly 651 (606, 619, 614, 616, 618) and FIG. 7 includes those assemblies positioned within a valve body 635 when the gate 602 is in a closed position. The first and second seat assemblies 650, 651 are positioned on both the upstream and downstream portions of the valve body 635. As a result, the seat assemblies 650, 651 provide improved sealing on both the upstream and downstream of the valve body. High pressure/High temperature seal assemblies 619, 620 are positioned between the seats and the valve body seat pocket walls. Although high pressure/high temperature seals are used in this embodiment, any type of seal may be used. With the low pressure conditions of FIG. 7, self seals 682 are present due to the spring force of spring 667. This is an "annular seal". There are also seals 652, 653, 654, 655 due to spring force (see "spring force" label in FIG. 7) from springs 613, 614.

Figure 8:
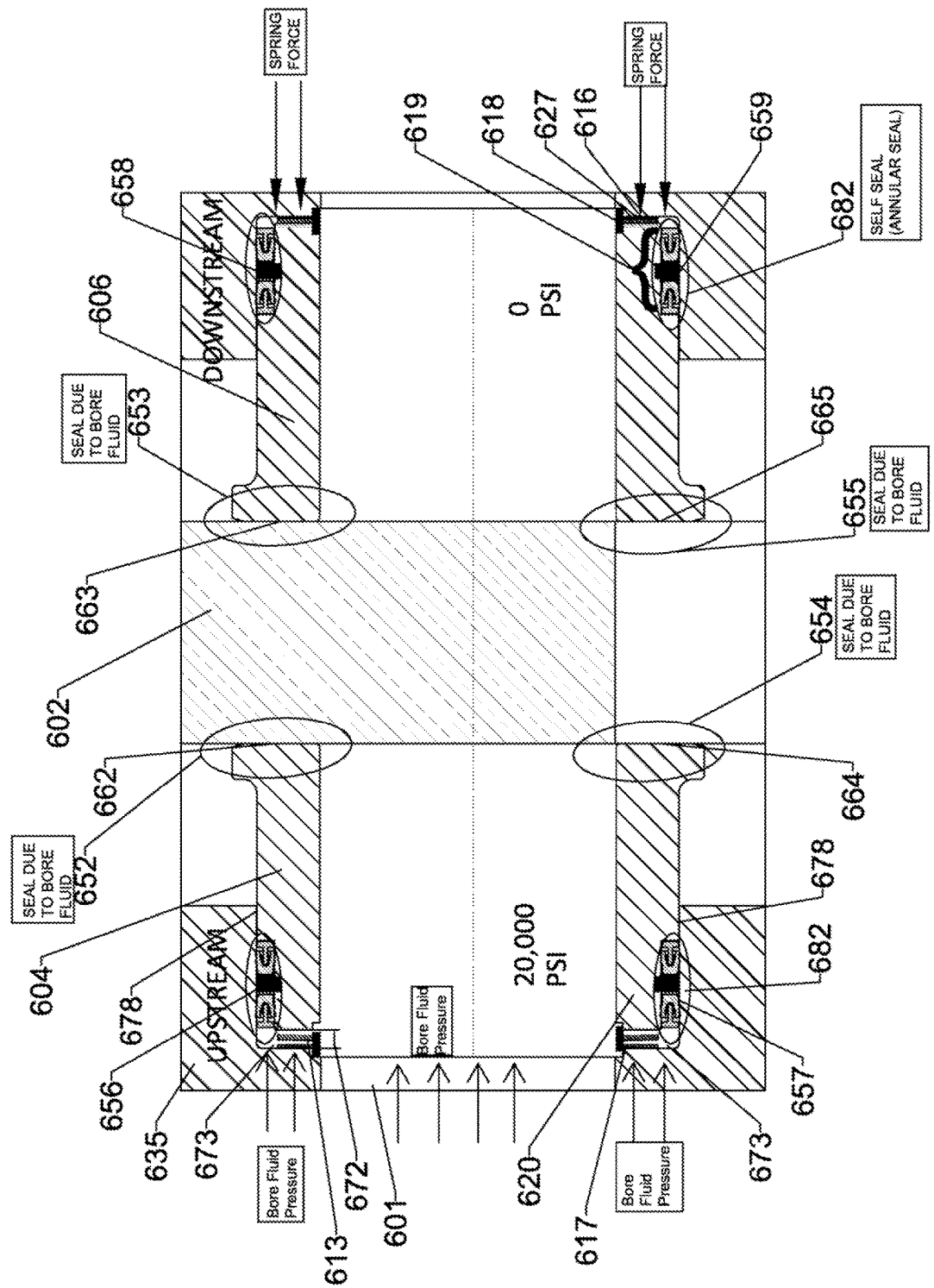
FIG. 8 illustrates gate valve function when the gate is fully closed with high pressure upstream of the gate in an embodiment of the invention.

In FIG. 8 the gate 602 is closed and fluid enters into the channel creating pressure (e.g., 20,000 psi). This causes the fluid to attempt to navigate around the seat (i.e., at the seat face/gate interface 662, 664 and seat face/valve body interface 678). Another seat face/valve body interface is indicated at element 679. The seal assembly 620 is spring energized by spring 667 (see FIG. 14), which effectively seals the leak paths/seals 656, 657 to the valve body cavity 609. While the pressure attempts to escape through the gaps 656, 657 between the seat assembly 650 and seat pocket 621 it also pushes the seat face against the gate surface 602 at seat face/gate interface 662, 664 and seals the leak paths/seals 652, 654 to the body cavity 609. This configuration creates a fully sealed valve channel no matter the direction of the flow. With the high pressure condition of FIG. 8, self seal 682 is present due to spring 667. However, seals 652, 653, 654, 655 are now sealed due to bore fluid pressure (labeled "bore fluid pressure" in FIG. 8). Sealing assembly 619 self-seals leak paths/seals 658, 659.

Figure 9:
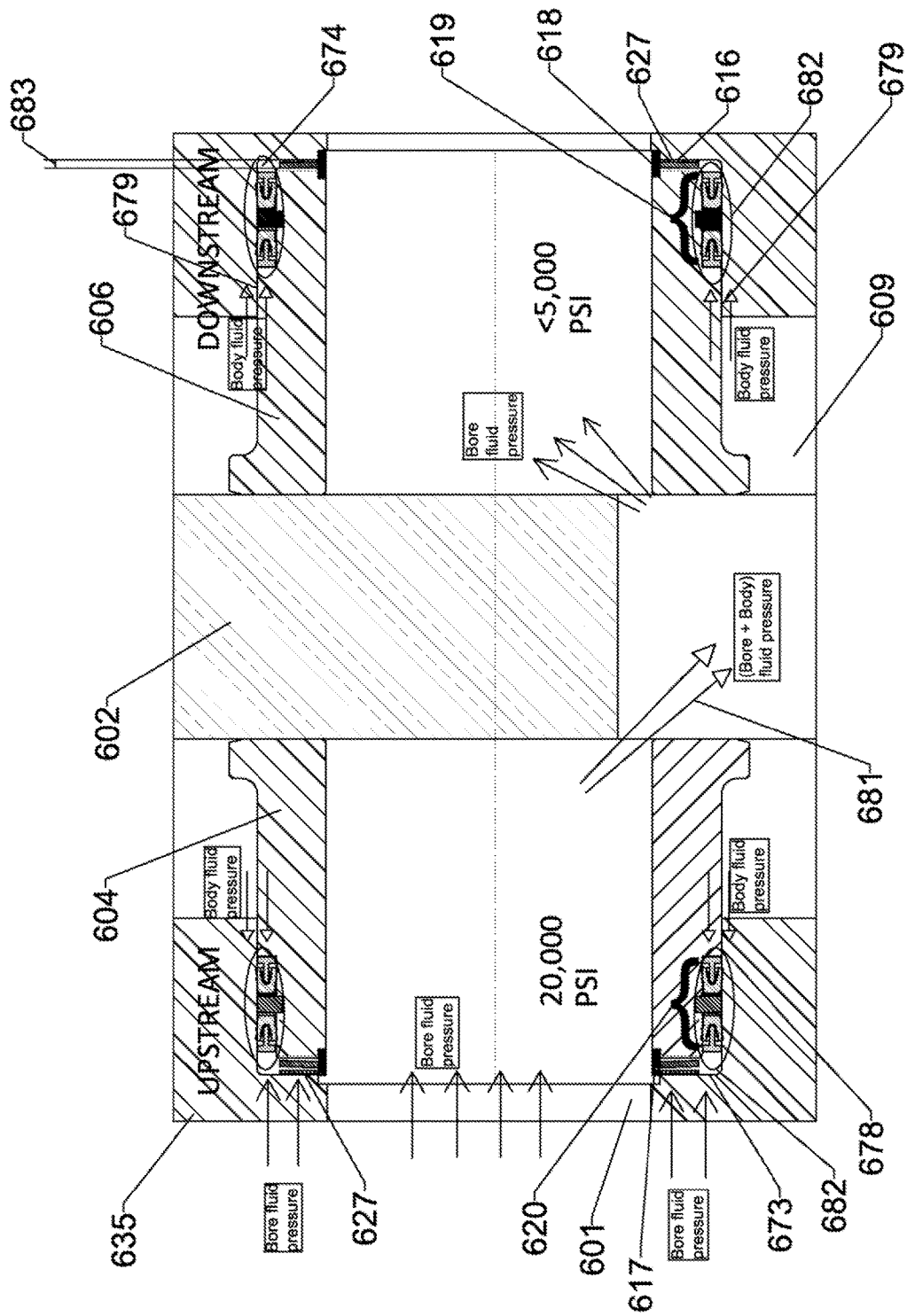
FIG. 9 illustrates gate valve function when the gate is partially closed with pressure upstream and downstream of the gate in an embodiment of the invention.
Figure 10:
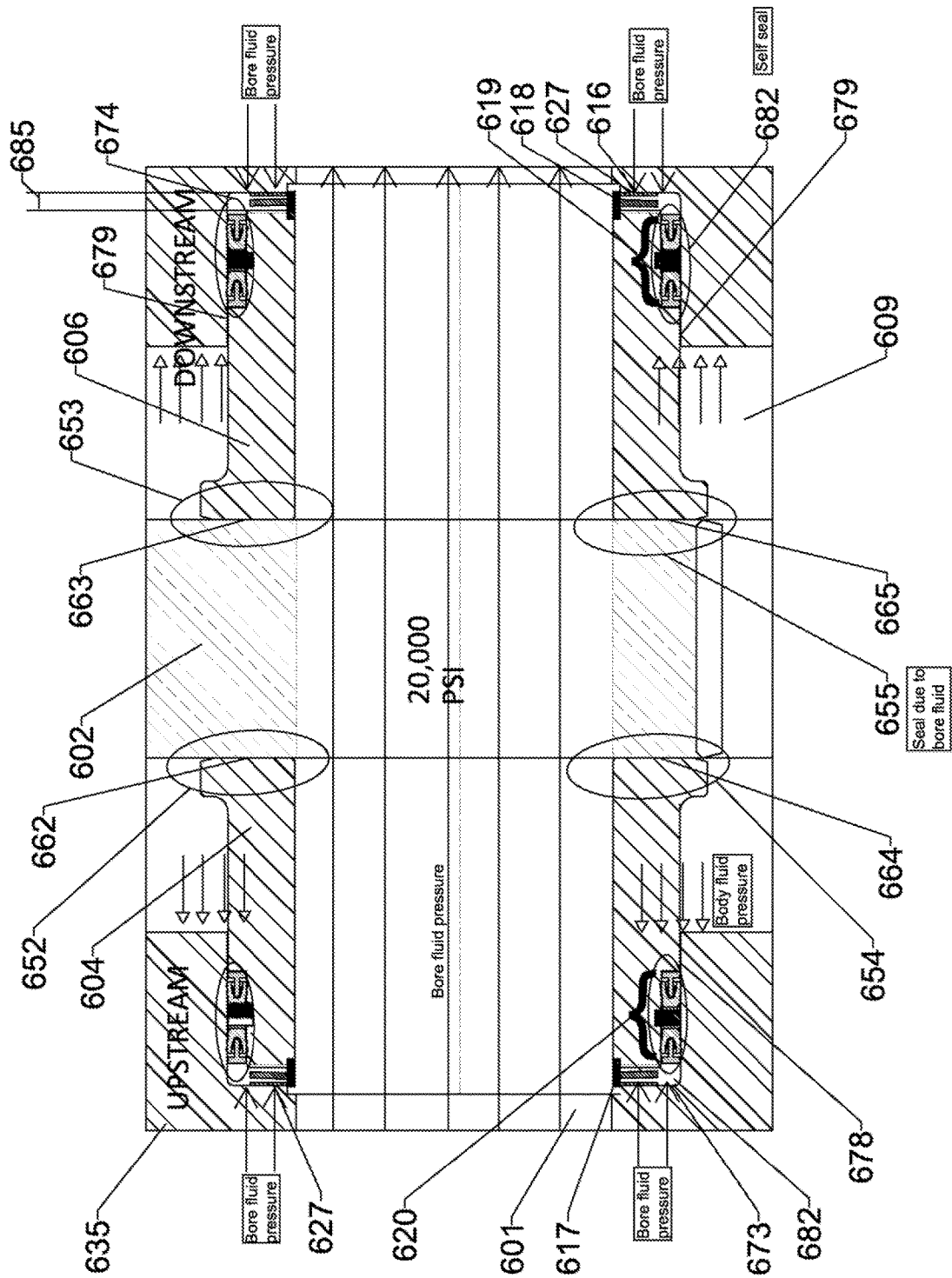
FIG. 10 illustrates gate valve function when the gate is fully open with high pressure upstream and downstream of the gate in an embodiment of the invention.

In FIG. 9 during operation of the gate, transitioning from closed to open, fluid 681 enters into the channel 601 and the valve body cavity 609. Valve body fluid is trapped in cavity 609 at full wellbore pressure when the valve is fully opened (FIG. 10). This is achieved by the well bore pressure energizing the seat on the upstream and downstream side. Specifically, as shown in FIG. 10, the well bore pressure moves the seats 604, 606 toward the seat face/gate interfaces 662, 663, 664, 665 of the gate, creating seals 652, 653, 654, 655 between the gate 602 and the seat assemblies 651. As a result, the valve body pressure is trapped in the body cavity. In FIG. 10, seals 682 are self annular seals and seals 652, 653, 654, 655 are seals due to bore fluid pressure.

Figure 11:
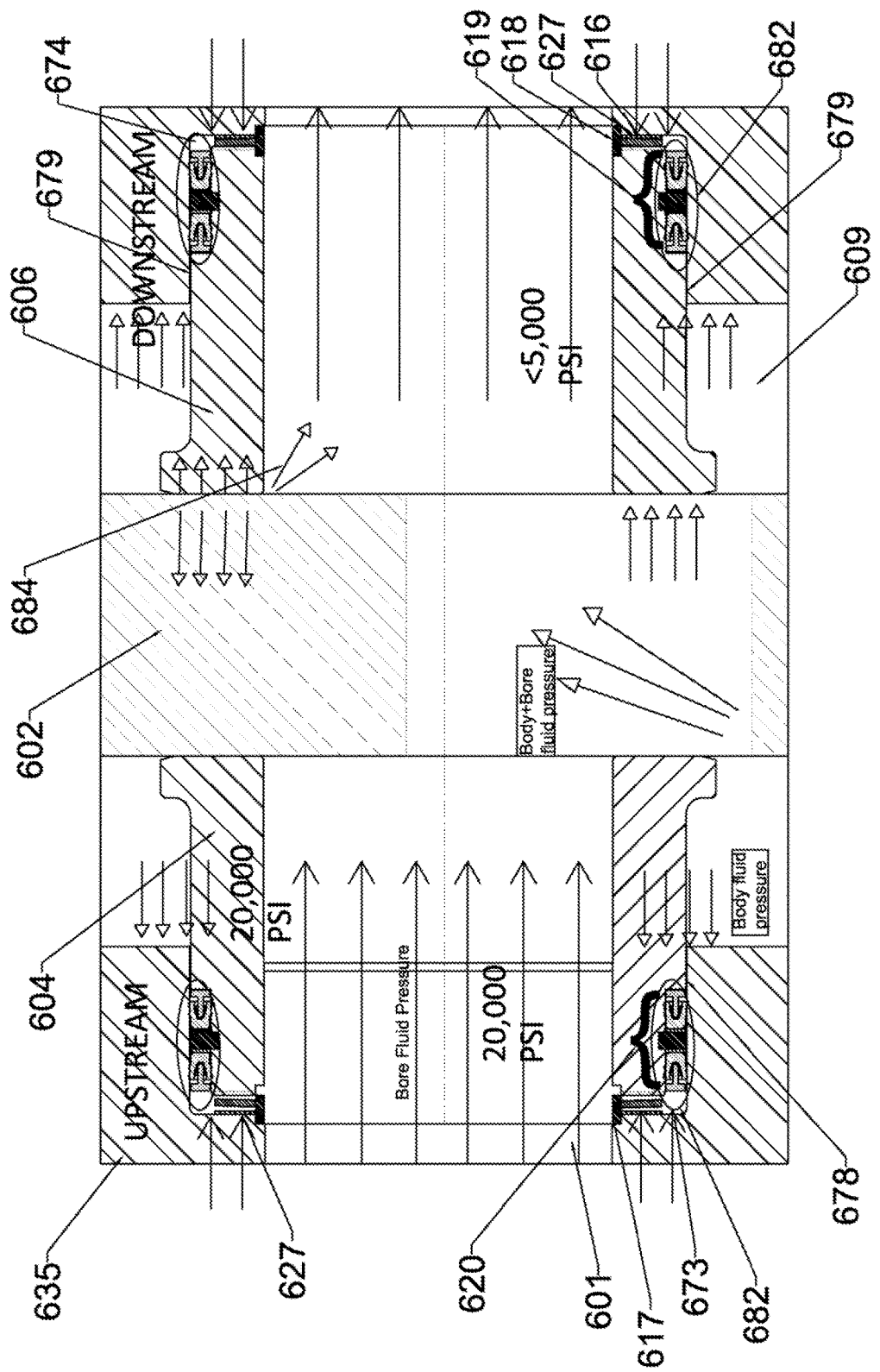
FIG. 11 illustrates gate valve function when the gate is partially closed with pressure upstream and downstream of the gate in an embodiment of the invention.

In FIG. 11, during the operation of the gate, transitioning from the open to close, the downstream pressure begins to decrease (e.g., from 20,000 psi to 5,000 psi), creating a pressure differential between the downstream area (5,000 psi) and body cavity 609 (20,000 psi in area 609). Concurrently, the decreasing downstream pressure also de-energizes the seat 606, removing the sealing force creating seal 653, 655 between the gate and seat. The large pressure trapped in the body cavity 609 separates the gate from the downstream seat, and escapes (see fluid 684) downstream via paths/weakened seals 653, 655. In FIG. 12, once fully closed the still energized upstream seat 604 seals 652, 654 against the gate 602, effectively closing the valve. There are self seals 682 as well as well bore pressure induced seals 652, 653, 654, 655.

The process 1300 of FIG. 13 will now be addressed in relation to FIGS. 7 to 12. In element 1305, the gate is closed with no channel pressure. FIG. 7 depicts gate 602 closed and no pressure in channel 601. As a result, both the proximal/upstream seat 604 and the distal/downstream seat 606 are pushed toward the gate by springs 613, 614. However, seals 652, 653, 654, 655 are sealed but not at a level that can prevent leaking should typical full "well bore" pressure of 20,000 psi be experienced. However, seals 652, 653, 654, 655 are effective low pressure seals.

In element 1310 gate 602 is closed with upstream pressure increasing. Fluid from upstream fills the proximal channel 601. The fluid enters the gap 673 between the seat pocket 621 and the seat 604, creating pressure on the seal assembly 620 thereby sealing the outer annular surface of the seat and the inner annular surface of the seat pocket (see interface 678). Concurrently, this pressure pushes the seat further towards the gate, energizing the seat and creating a seat-gate seal 652, 654. Please note that distance 671 (FIG. 7) is smaller than distance 672 (FIG. 8) for void 673 due to upstream pressure pushing on the gate 602 and compressing spring 614 on the downstream side.

In element 1315 gate 602 is closed with upstream pressure at its maximum (FIG. 8). By "maximum" this just means maximum in this particular fluid flow episode and is not meant to mean the maximum pressure the device can handle before failure. When upstream is at full working pressure (e.g., 20,000 psi), the proximal/upstream seat 604 is fully sealed (seals 652, 654, 682) and the distal/downstream seat 606 is also in a sealing position due to the force of the upstream seat 604 pushing on the gate 602 (i.e., springs 613, 614 only serve to provide enough sealing force for low pressures). Seals 682 from annular seals 619, 620 are always in existence and are not necessarily dependent (or as dependent) on pressure differentials between chamber 601 and cavity 609 as other seals 652, 653, 654, 655. They are "self seals".

In element 1320 gate 602 is barely open with max upstream pressure in channel 601 (FIG. 9). As the gate starts to open the body cavity 609 is at ambient pressure. As the gate clears the seat, upstream fluid flows into the body cavity (681) and into the gap 674 between the downstream seat pocket 622 and seat 606.

In element 1325 gate 602 is partially open with max upstream pressure. Once the body cavity 609 is full, pressure is applied to the body cavity 609 and the distal seat assembly 651. This (along with force in void 674) energizes the seat 606, pushing the downstream seat 606 towards the gate 602. Concurrently, the fluid in the valve cavity 609 is pressurized up to full pressure.

In element 1330 gate 602 is fully open with max channel pressure in channel 601 (FIG. 10). Fluid in downstream channel 602 puts pressure on downstream seat 606. This pushes distal seat towards gate 602, creating a downstream seal and fully sealed valve channel. Please note that distance 683 (FIG. 9) is smaller than distance 685 (FIG. 10) for void 674. The body cavity 609 fluid is sealed at max pressure (wellbore pressure).

In element 1335 gate 602 is barely closed with max channel pressure in channel 601 along both the proximal and distal portions of channel 601 (FIG. 11). As the gate closes the body cavity 609 is at max pressure. As the gate clears the seat, downstream fluid pressure decreases (e.g., 5,000 psi), creating a pressure differential between the high pressure cavity 609 (e.g., 20,000 psi) and low pressure downstream channel.

In element 1340 gate 602 is partially closed with max channel pressure in the upstream portion of channel 601. With gate 602 half-closed distal channel pressure is much less than cavity and upstream channel pressure. Lowered pressure de-energizes the distal seat 606 so cavity 609 fluid (at 20,000 psi) separates the seat face from the gate (see seals 653, 655) at seat/gate interface 663, 665, allowing cavity fluid to empty downstream (684) and dropping cavity 609 pressure to 5,000 psi or less.

In element 1345 gate 602 is closed with upstream pressure at a maximum. When fully closed, flow is contained in the upstream portion of channel 601. The upstream seat 604 previously experienced full pressure (FIG. 8) so upstream seat 604 is still energized and holds its seal 652, 654 with gate 602.

Example 1 includes a gate valve assembly comprising: a valve body having a channel extending from a distal end to a proximal end; a gate configured to be moved from a first position to a second position, the second position being when the gate is positioned in the channel of the valve body between the distal end and the proximal end of the valve body; at least one seat configured to be positioned within a pocket of the valve body; a seal assembly adapted on a step of the seat positioned between the valve body wall and the seat, wherein the seal is a dynamic seal providing no gaps and/or spaces between the seat and the valve body allowing no fluid to flow into the valve body.

In example 2 the subject matter of the Example 1 can optionally include wherein the gate valve assembly further comprises a trash ring, which comprises a perforated metallic ring that acts as a filter and is positioned within a groove of the seat.

In example 3 the subject matter of the Examples 1-2 can optionally include wherein the gate valve assembly further comprises a gap between the seat and valve body.

In example 4 the subject matter of the Examples 1-3 can optionally include wherein the trash ring includes a plurality of holes.

In example 5 the subject matter of the Examples 1-4 can optionally include wherein when the gate is in a closed position, the seat and the gate have metal to metal contact.

In example 6 the subject matter of the Examples 1-5 can optionally include wherein a disc spring is positioned between the seat and the valve body.

Example 7 includes a gate valve assembly comprising: a valve body having a channel extending from a distal end to a proximal end; a gate configured to be moved from a first position to a second position, the second position being when the gate is positioned in the channel of the valve body between the distal end and the proximal end of the valve body; at least one seat configured to be positioned within a pocket of the valve body; a seal assembly adapted on a step of the seat positioned between the valve body and the seat, wherein the seal assembly is a dynamic seal providing no gaps and/or spaces between the seal and the valve body allowing no fluid to leak into the valve body.

In example 8 the subject matter of the Example 7 can optionally include wherein the gate valve assembly further comprises a trash ring positioned within a groove of the seat and valve body.

In example 9 the subject matter of the Examples 7-8 can optionally include wherein the gate valve assembly further comprises a gap between the seat and the valve body.

In example 10 the subject matter of the Examples 7-9 can optionally include wherein the trash ring includes a plurality of holes In example 11 the subject matter of the Examples 7-10 can optionally include wherein a disc spring is positioned between the seat and valve body.

The above examples and embodiments provide many advantages over convention systems such as, for example, (1) only two potential leak paths (between seat and seat pocket and between seat and gate) as opposed to three potential leak paths (between seat retainer and seat pocket, between the seat retainer/insert and the seat, and between the seat and gate), (2) does not require a secured insert such as a seat retainer, and (3) reduces machining and replacement parts (e.g., because no seat retainer is needed).

Example 1a includes a gate valve comprising: a valve body including a cavity in fluid communication with a channel, having proximal and distal channel portions, which extends between proximal and distal valve body portions; a gate configured to seal the channel in a closed gate position and unseal the channel in an open gate position; a proximal seat between the proximal valve body portion and the gate and a distal seat between the distal valve body portion and the gate; wherein (a) the proximal seat slides towards the gate and then stops at a first position when the gate is in the closed gate position and the proximal channel portion includes fluid more highly pressurized than fluid included in the cavity, and (b) the distal seat slides away from the gate and then stops at a second position when the gate is in the closed gate position and the cavity includes fluid more heavily pressurized than fluid in the distal channel portion.

For example, in an embodiment as soon as there is a pressure differential (e.g., the upstream side has more pressure acting on the surface area of the seat than the downstream side), the seat and gate will move. The seat and gate will have fully moved laterally before the gate has completely transitioned from an open position to a closed position. Afterwards, there will be no more movement before the gate is fully closed, which is why there are bevels on the seats in some embodiments—to allow the gate to slide into position.

For example, FIGS. 5-12 depict an embodiment of a gate valve comprising: a valve body 635 including a cavity 609 in fluid communication with a channel 601. The proximal seat 604 slides towards the gate 602 and then stops at a first position when the gate is in the closed gate position and the proximal channel portion includes fluid more highly pressurized than fluid included in the cavity (FIG. 8). Further, the distal seat 606 slides away from the gate and then stops at a second position when the gate is in the closed gate position and the cavity includes fluid more heavily pressurized than fluid in the distal channel portion (FIGS. 11 and 12).

The slide of the distal seat away from the gate may occur before the gate is fully closed. The slide of the proximal seat towards the gate may occur before the gate is fully closed.

An alternative embodiment of Example 1A includes a gate valve comprising: a valve body including a cavity in fluid communication with a channel, having proximal and distal channel portions, which extends between proximal and distal valve body portions; a gate configured to seal the channel in a closed gate position and unseal the channel in an open gate position; a proximal seat between the proximal valve body portion and the gate and a distal seat between the distal valve body portion and the gate; wherein (a) the proximal seat slides towards the gate and into a first position when the gate is in the closed gate position and the proximal channel portion includes first fluid pressurized at more than 100 psi, and (b) the distal seat slides away from the gate and into a second position when the gate is in the closed gate position and the cavity includes second fluid more heavily pressurized than third fluid in the distal channel portion.

In example 2a the subject matter of Example 1a can optionally include wherein the proximal seat directly contacts the gate in the first position.

For example, a metal to metal seal occurs at seal 652.

An alternative embodiment of example 2a includes the subject matter of Example 1a and can optionally include the proximal seat slides along an interface with the valve body and towards the gate and then stops at a first position when the gate is in the closed gate position and the proximal channel portion includes fluid more highly pressurized than fluid included in the cavity.

For example, a vertical axis may be orthogonal to a horizontal axis that extends along channel 601. The vertical axis may intersect both the proximal seat and the valve body.

The interface may be a direct or indirect connection between the proximal seat and the valve body.

In example 3a the subject matter of the Examples 1a-2a can optionally include wherein the proximal seat directly contacts the gate in the first position.

For example, a metal to metal seal occurs at location/interface 662.

In example 4a the subject matter of the Examples 1a-3a can optionally include wherein the proximal seat is monolithic.

For example, seat 604 is uniform and formed from a single piece of material. However, in other embodiments the seat may be non-monolithic and be an assembly of non-uniform parts. In an embodiment the monolithic seat simultaneously contacts the gate and valve body during the pressure conditions addressed in FIGS. 7-12.

In example 5a the subject matter of the Examples 1a-4a can optionally include wherein in the first position the proximal seat simultaneously provides a first seal directly with the gate and a second seal directly with the valve body.

For example, seals 652, 682 exist simultaneously.

In example 6a the subject matter of the Examples 1a-5a can optionally include wherein the proximal seat slides away from the gate and into a third position when the gate is in the closed gate position and the proximal channel portion includes fluid less pressurized than fluid included in the cavity.

While this is not depicted in FIGS. 5-12, this situation may occur in certain conditions.

In example 7a the subject matter of the Examples 1a-6a can optionally include wherein the proximal seat includes a first seat face separated from a first valve body face by a first void having a first length in the first position and a third length in the third position, the first length being greater than the third length.

An example of such a void includes void 673. Further, an example of "first length" is length 672 (FIG. 8) and an example of "third length" is length 671 (FIG. 7).

In example 8a the subject matter of the Examples 1a-7a can optionally include wherein in the first position the void includes fluid that is in fluid communication with fluid in the proximal channel portion.

As mentioned above, fluid may flow from chamber 601 into void 673 to cause seat 604 to slide towards gate 602.

In example 9a the subject matter of the Examples 1a-8a can optionally include wherein the distal seat slides towards the gate and into a fourth position when the gate is in the closed gate position and the distal channel portion includes fluid more highly pressurized than fluid included in the cavity.

An example of this occurs in FIGS. 9 and 10.

In example 10a the subject matter of the Examples 1a-9a can optionally include wherein the distal seat includes a second seat face separated from a second valve body face by a second void having a second length in the second position and a fourth length in the fourth position, the fourth length being greater than the second length.

An example of such a void includes void 674. Further, an example of "second length" is length 683 (FIG. 9) and an example of "fourth length" is length 685 (FIG. 10).

In example 11a the subject matter of the Examples 1a-10a can optionally include at least two ring seals, an annular spring seal located between the valve body and the proximal seat, another annular spring seal located between the valve body and the distal seat, and at least two seat pocket protectors.

Example 12a includes a gate valve comprising: a valve body including a cavity coupled to a channel having proximal and distal portions; a gate to seal and unseal the channel; proximal and distal seats adjacent the gate; wherein (a) the proximal seat traverses towards the gate and stops at a first position when the gate is closed and the proximal channel portion is more highly pressurized than the cavity, and (b) the distal seat traverses away from the gate and stops at a second position when the gate is closed and the cavity is more heavily pressurized than the distal channel portion.

However, another embodiment of example 12a includes a gate valve comprising: a valve body including a cavity coupled to a channel having proximal and distal portions; a gate to seal and unseal the channel; proximal and distal seats adjacent the gate; wherein (a) the proximal seat traverses towards the gate and stops at a first position when the gate is closed and the proximal channel portion is more highly pressurized than the cavity, and (b) the distal seat is static and seals to the gate. Thus, there is an option with one static seal and one dynamic seal.

In example 13a the subject matter of the Examples 12a can optionally include wherein the proximal seat directly contacts the gate and the valve body in the first position.

In example 14a the subject matter of the Examples 12a-13a can optionally include wherein the gate includes an aperture that aligns with the channel when the gate is open.

An alternative version of example 14a includes the subject matter of the Examples 12a-13a can optionally include wherein the proximal seat traverses along an interface with the valve body towards the gate and stops at the first position when the gate is closed and the proximal channel portion is more highly pressurized than the cavity.

In example 15a the subject matter of the Examples 12a-14a can optionally include wherein the proximal seat is monolithic.

In example 16a the subject matter of the Examples 12a-15a can optionally include wherein in the first position the proximal seat seals the gate and the valve body.

In example 17a the subject matter of the Examples 12a-16a can optionally include wherein the proximal seat traverses away from the gate and into a third position when the gate is closed and the proximal channel portion is less pressurized than the cavity.

In example 18a the subject matter of the Examples 12a-17a can optionally include wherein the proximal seat is separated from the valve body by a first void having a first length in the first position and a third length in the third position, the first length being greater than the third length.

In example 19a the subject matter of the Examples 12a-18a can optionally include wherein in the first position the void includes fluid that is in fluid communication with fluid in the proximal channel portion.

In example 20a the subject matter of the Examples 12a-19a can optionally include wherein the distal seat traverses towards the gate and into a fourth position when the gate is closed and the distal channel portion is more highly pressurized than the cavity.

In example 21a the subject matter of the Examples 12a-20a can optionally include wherein the distal seat is separated from the valve body face by a second void having a second length in the second position and a fourth length in the fourth position, the fourth length being greater than the second length.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. These terms are relative to how one positions the gate valve embodiment. The term "on" as used herein (including in the claims) does not indicate that a first element "on" a second element is directly on and in immediate contact with the second element unless such is specifically stated; there may be a third element (e.g., gasket) or other structure between the first element and the second element. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A gate valve comprising:
   a valve body including a cavity in fluid communication with a channel, having proximal and distal channel portions, which extends between proximal and distal valve body portions;
   a gate configured to seal the channel in a closed gate position and unseal the channel in an open gate position;
   a monolithic proximal seat between the proximal valve body portion and the gate and a distal seat between the distal valve body portion and the gate;
   annular first and second ring seals, an annular spring located between the valve body and the proximal seat, and another annular spring located between the valve body and the distal seat; and
   a ring between the first and second ring seals and directly contacting the valve body;
   wherein (a) the proximal seat slides towards the gate and then stops at a first position when the gate transitions to the closed gate position and the proximal channel portion includes fluid more highly pressurized than fluid included in the cavity, (b) the distal seat slides away from the gate and then stops at a second position when the gate transitions to the closed gate position and the cavity includes fluid more heavily pressurized than fluid in the distal channel portion; (c) the proximal seat slides away from the gate and into a third position when the gate transitions to the closed gate position and the proximal channel portion includes fluid less pressurized than fluid included in the cavity, and (d) the distal seat slides towards the gate and into a fourth position when the gate transitions to the closed gate position and the distal channel portion includes fluid more highly pressurized than fluid included in the cavity;
   wherein the proximal seat slides along an interface with the valve body and towards the gate and then stops at the first position when the gate transitions to the closed gate position and the proximal channel portion includes fluid more highly pressurized than fluid included in the cavity; and
   wherein in the first position: (a) the proximal seat directly contacts the gate, (b) the proximal seat simultaneously provides a first seal directly with the gate and a second seal directly with the valve body, and (c) the proximal seat includes a first wall separated from a first valve body face by a first void having a first length in the first position and a third length in the third position, the first length being greater than the third length;
   wherein: (a) the first and second ring seals are located between the valve body and a second wall of the proximal seat and the annular spring is located between the valve body and the first wall of the proximal seat, (b) the first ring seal is configured to deter fluid from flowing distally and the second ring seal is configured to deter fluid from flowing proximally, and (c) the first ring seal includes a first spring and the second ring seal includes a second spring.

2. The valve of claim 1, wherein:
   the first and second ring seals respectively include first and second hat rings and first and second seal casings;
   the first spring is energized by a clearance between the valve body and the proximal seat and is compressed and actively pushing outward against the compression;
   the first hat ring, when applied with fluid pressure, stabilizes the first spring; and
   when fluid pressure enters the first spring the fluid pressure causes the first spring to flare outward and force the first seal casing against the proximal seat and valve body.

3. The valve of claim 2, wherein the first and second walls of the proximal seat are orthogonal to each other.

4. The valve of claim 3, wherein the distal seat includes a wall separated from a second valve body face by a second void having a second length in the second position and a fourth length in the fourth position, the fourth length being greater than the second length.

5. A gate valve comprising:
   a valve body including a cavity configured to be in fluid communication with a channel, the channel: (a) having proximal and distal channel portions, and (b) extending between proximal and distal valve body portions;
   a gate configured to seal the channel in a closed gate position and unseal the channel in an open gate position;
   a proximal seat between the proximal valve body portion and the gate and a distal seat between the distal valve body portion and the gate, the proximal seat including an annular groove on an outer surface of the proximal seat;
   at least one seal between the valve body and the proximal seat, the at least one seal including: (a) a first ring contacting a first spring and a second ring contacting a second spring, (b) an annular ring included in the annular groove and between the gate and the first spring; and
   a proximal resilient member between the valve body and the proximal seat and a distal resilient member between the valve body and the distal seat, wherein the proximal resilient member biases the proximal seat distally and the distal resilient member biases the distal seat proximally;
   wherein (a) the proximal seat is configured to slide towards the gate and stop at a first position when the gate is in the closed gate position, (b) the first spring is not included in the annular groove; (c) the first ring is not included in the annular groove; (d) the proximal seat directly contacts the gate in the first position, and (e) the proximal seat is monolithic.

6. The valve of claim 5, wherein the proximal seat is configured to slide along an interface with the valve body and towards the gate and then stop at the first position when the gate is in the closed gate position and the proximal channel portion includes fluid more highly pressurized than fluid included in the cavity.

7. The valve of claim 5, wherein:
   the annular groove includes a first sidewall, a second sidewall, and a floor that couples the first sidewall to the second sidewall;
   the channel includes a long axis that extends through the proximal and distal channel portions; and
   an additional axis, which is parallel to the long axis, intersects the first and second rings.

8. The valve of claim 7, wherein:
   in the first position the proximal seat simultaneously provides a first seal directly with the gate and a second seal directly with the valve body; and
   the second seal is provided via the at least one seal.

9. The valve of claim 8, wherein:
   the first ring and the first spring are collectively configured to resist fluid flowing distally; and
   the second ring and the second spring are collectively configured to resist fluid flowing proximally.

10. The valve of claim 5, wherein the annular ring is between the first and second springs based on the annular ring being proximal to the second spring and distal to the first ring.

11. A gate valve comprising:
    a valve body including a cavity configured to be in fluid communication with a channel, the channel: (a) having proximal and distal channel portions, and (b) extending between proximal and distal valve body portions;
    a gate configured to seal the channel in a closed gate position and unseal the channel in an open gate position;
    a proximal seat between the proximal valve body portion and the gate and a distal seat between the distal valve body portion and the gate;
    at least one seal between the valve body and the proximal seat, the at least one seal including a first ring contacting a first spring and a second ring contacting a second spring;
    an annular ring on an outer surface of the proximal seat and between the first and second springs; and
    a proximal resilient member between the valve body and the proximal seat and a distal resilient member between the valve body and the distal seat, wherein the proximal resilient member biases the proximal seat distally and the distal resilient member biases the distal seat proximally;
    wherein (a) the first spring does not directly contact the annular ring; (b) the first ring does not directly contact the annular ring; (c) the proximal seat is configured to directly contact the gate when the gate is closed, and (d) the proximal seat is monolithic; and
    wherein (a) the first ring and the first spring are collectively configured to resist fluid flowing distally; and (b) the second ring and the second spring are collectively configured to resist fluid flowing proximally.

12. The valve of claim 11 comprising:
    an additional first annular ring between the annular ring and the first spring; and
    an additional second annular ring between the annular ring and the second spring.

13. The valve of claim 12, wherein:
    the channel includes a central long axis that extends through the proximal and distal channel portions; and
    an additional axis, which is parallel to the central long axis, intersects the first and second rings.

* * * * *